US011505132B2

(12) United States Patent
Pitugnarongphor

(10) Patent No.: US 11,505,132 B2
(45) Date of Patent: Nov. 22, 2022

(54) BICYCLE MOUNTING DEVICE

(71) Applicant: Virapol Pitugnarongphor, Monterey Park, CA (US)

(72) Inventor: Virapol Pitugnarongphor, Monterey Park, CA (US)

( * ) Notice: Subject to any disclaimer, the term of this patent is extended or adjusted under 35 U.S.C. 154(b) by 93 days.

(21) Appl. No.: 17/209,317

(22) Filed: Mar. 23, 2021

(65) Prior Publication Data

US 2022/0306009 A1  Sep. 29, 2022

(51) Int. Cl.
*B60R 9/10* (2006.01)
*B62H 3/08* (2006.01)

(52) U.S. Cl.
CPC ............... *B60R 9/10* (2013.01); *B62H 3/08* (2013.01)

(58) Field of Classification Search
CPC ....................................................... B62H 3/08
See application file for complete search history.

(56) References Cited

U.S. PATENT DOCUMENTS

| | | | | |
|---|---|---|---|---|
| 4,629,104 | A * | 12/1986 | Jacquet | B60R 9/10 224/558 |
| 5,690,259 | A | 11/1997 | Montani | |
| 6,382,480 | B1 * | 5/2002 | Egly | B60R 5/00 224/310 |
| 10,518,713 | B1 * | 12/2019 | Yoon | B60R 9/06 |
| 10,562,434 | B2 * | 2/2020 | Bizcarguenaga Ansola | B60R 5/00 |
| 2013/0175308 | A1 | 7/2013 | Sautter et al. | |
| 2014/0076946 | A1 * | 3/2014 | Ressler | B62H 3/00 224/400 |
| 2014/0124551 | A1 * | 5/2014 | Condon | B60R 9/10 224/324 |
| 2015/0321619 | A1 | 11/2015 | Jung | |
| 2019/0016270 | A1 * | 1/2019 | Nordström | B60R 9/048 |

FOREIGN PATENT DOCUMENTS

| | | |
|---|---|---|
| DE | 202006006847 U1 | 8/2006 |
| EP | 0141757 A1 | 5/1985 |
| WO | 2014071549 A1 | 5/2014 |

* cited by examiner

*Primary Examiner* — Corey N Skurdal
(74) *Attorney, Agent, or Firm* — Argus Intellectual Enterprise; Jordan Sworen; Daniel Enea

(57) ABSTRACT

A bicycle mounting device for storing and transporting a bicycle in a horizontal or vertical orientation. The mounting device includes a frame formed by a pair of longitudinal members and a first and second lateral member each affixed at opposing ends thereof. A sliding bicycle support is operably connected to the pair of longitudinal members and can receive the bicycle in a horizontal orientation. In some embodiments, the first end of the frame is raised relative to the second end thereof. In use, the device is placed in a trunk of a vehicle and the horizontally oriented bicycle is placed on the sliding support. The bicycle can then be pushed into the trunk by the sliding support moving from the first to the second end of the frame. The pair of longitudinal members form a gap to receive a tire of the bicycle when stored in the vertical orientation.

20 Claims, 7 Drawing Sheets

BICYCLE MOUNTING DEVICE

BACKGROUND OF THE INVENTION

The present invention relates to a bicycle mounting device. The present invention further provides a bicycle mounting device for storing and transporting a bicycle in a horizontal and vertical orientation.

Existing support racks for transporting bicycles are typically connected to a vehicle such that the bicycle is stored exterior to the vehicle. The bicycle is either stored upright on the roof of the vehicle or an extension of the vehicle rear. This manner of storage leaves the bicycle exposed to environment factors such as rain, dirt, and other vehicles, which can lead to bicycle damage.

An alternative storage method is placing a bicycle in the trunk of a vehicle by laying it flat or horizontally. A person is required to maneuver the bicycle until it is fully positioned within the vehicle and the trunk door can shut, which is cumbersome and causes the bicycle to easily entangle with other objects stored in the trunk. Further, the bicycle can shift during transportation causing further entanglement or damage to other objects within the vehicle.

These existing devices and methods fail to disclose a frame with a sliding bicycle support adapted to support the bicycle in a horizontal orientation. Moreover, no device includes a longitudinal member that comprises a gap sized to receive a wheel of the bicycle such that the frame supports the bicycle in a vertical orientation, as well.

In light of the devices disclosed in the known art, it is submitted that the present invention substantially diverges in design elements and methods from the known art and consequently it is clear that there is a need in the art for an improvement for a bicycle mounting device. In this regard the instant invention substantially fulfills these needs.

SUMMARY OF THE INVENTION

In view of the foregoing disadvantages inherent in the known types of bicycle mounting devices now present in the known art, the present invention provides a new bicycle mounting device wherein the same can be used to store in a vehicle in both a horizontal and vertical orientation.

It is an object of the present invention to provide a bicycle mounting device comprising a frame forming an I-shape having a longitudinal member, a first lateral member and a second lateral member, wherein the first lateral member is affixed to a first end of the pair of longitudinal members and the second lateral member is affixed to an opposing second end of the longitudinal member. A gap is formed within the longitudinal member or, in some embodiments, between a pair of longitudinal members and configured to support the bicycle in an upright orientation.

It is another object of the present invention to provide a bicycle mounting device having a sliding bicycle support operably connected to the pair of longitudinal members and adapted to support the bicycle in a horizontal orientation, wherein the sliding bicycle support adapted to slide between the first and second end thereof.

It is yet another object of the present invention is to provide a bicycle mounting device wherein the sliding bicycle support comprises a plate having a post disposed in a center thereof and a pair of brackets disposed along opposing lateral edges of the plate. An end of each of the pair of brackets is angled away from the post and the plate tapers toward the first end of pair of longitudinal members.

It is therefore an object of the present invention to provide a new and improved bicycle mounting device that has all of the advantages of the known art and none of the disadvantages.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
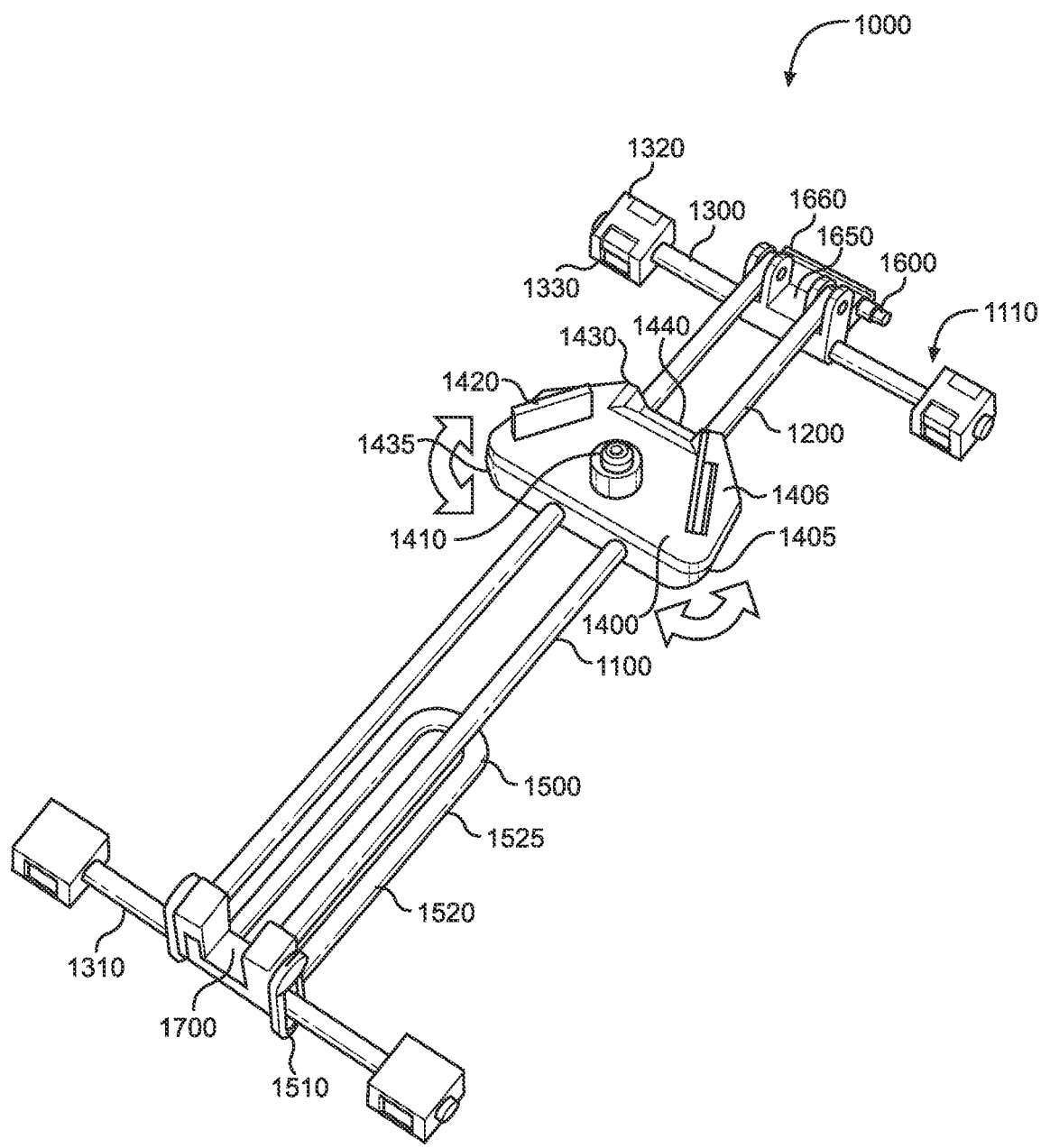
FIG. 1 shows a perspective view of a first embodiment of the bicycle mounting device.

Reference is made herein to the attached drawings. Like reference numerals are used throughout the drawings to depict like or similar elements of the bicycle mounting device. For the purposes of presenting a brief and clear description of the present invention, the preferred embodiment will be discussed as used for mounting a bicycle to the device in both a horizontal and vertical orientation. The figures are intended for representative purposes only and should not be considered to be limiting in any respect.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment", "first embodiment", "second embodiment", or "third embodiment" does not necessarily refer to the same embodiment.

Figure 2:
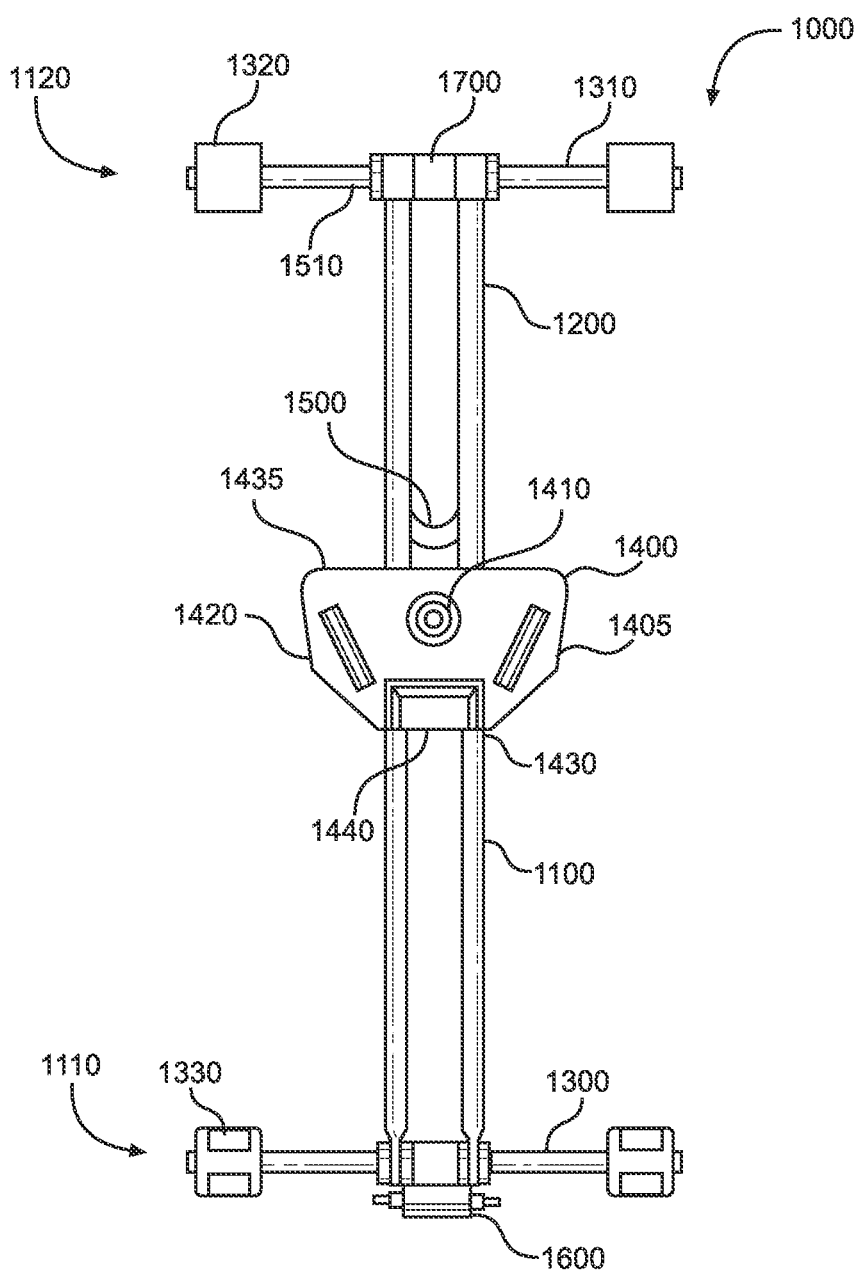
FIG. 2 shows a top planar view of a first embodiment of the bicycle mounting device.

Referring now to FIGS. 1 and 2, there is shown a perspective view and a top planar view of a first embodiment of the bicycle mounting device, respectively. The bicycle mounting device 1000 comprises a frame configured to mount inside a vehicle or surface capable of receiving a bicycle in both a horizontal and vertical orientation. In the illustrated embodiment, the bicycle mounting device 1000 comprises a frame 1100 forming an I-shape. The frame 1100 comprises a pair of longitudinal members 1200 and a pair of lateral members 1300, 1310 affixed to opposing end of the longitudinal members. In some embodiments, the frame 1100 comprises only a single longitudinal member. In alternated embodiments, the frame comprises more than two longitudinal members. The longitudinal and lateral members 1200, 1300 are perpendicular to one another, thereby forming the I-shape. In the illustrated embodiment, the longitudinal members are parallel to one another. However, in alternate embodiments, it is contemplated that the longitudinal members are not parallel to one another and taper between the lateral members, forming a V-shape.

The frame has a front end 1110 and a rear end 1120, wherein a first lateral member 1300 is positioned at the front end 1110 and a second lateral member 1310 is positioned at the rear end 1120. The longitudinal members 1200 are longer than the lateral members 1300 such that the lateral members 1300 support and stabilize the longitudinal members 1200. The longitudinal members 1200 are configured to support and receive the bicycle thereon. In the illustrated embodiment, the longitudinal members 1200 are secured to a center of each lateral member 1300, wherein the center is measured between opposing ends of each lateral member 1300, 1310. In the illustrated embodiment, the longitudinal and lateral members are rigid and tubular.

In the illustrated embodiment, a pair of stabilizing supports 1320 are disposed on opposing end of each of the pair of lateral members 1300, 1310. The stabilizing supports 1320 are disposed at the outermost end of the lateral member 1300. However, in alternate embodiments, the stabilizing supports are disposed along any point of the lateral member. The stabilizing supports are adapted to maintain the bicycle mounting device 1000 in a stationary position while the vehicle is in motion. In the illustrated embodiment, each stabilizing support 1320 comprises a quadrilateral cross section having planar lower surface adapted to rest flush on a surface. The stabilizing supports 1320 raise the lateral members 1300 and longitudinal members 1200 from the surface so not have any direct contact therewith. In some embodiments, a fastener is disposed on the lower surface of at least one of the stabilizing support to prevent movement of the bicycle mounting device 1000 when positioned on a surface. In the illustrated embodiment, the fastener is hook and loop material configured to secure to a carpet material of the vehicle. However, in alternate embodiments, any suitable fastener is positioned on the lower surface of the stabilizing supports, such as a non-slip or textured layer.

In the illustrated embodiment, the stabilizing supports 1320 comprises a channel or aperture configured to receive a cord or tie to secure the bicycle mounting device to a vehicle. The channel extends from a first side of the stabilizing support to an adjacent side of the same stabilizing support. Another channel is positioned on the opposite end of the adjacent side extending through to an opposing second side. In this way, the cord is passed through each channel and then tied or secured to a fixed portion of the vehicle, such as a trunk hook.

A sliding bicycle support 1400 is operably connected to the pair of longitudinal members 1200, wherein the sliding bicycle support 1400 is adapted to slide between the front and rear end 1110, 1120 of the frame 1100. In the illustrated embodiment, the longitudinal members 1200 extend through a pair of corresponding apertures through opposing sides of the sliding bicycle support 1400. The aperture arrangement allows the sliding bicycle support 1400 to slide along the longitudinal members 1200. In alternate embodiments, the sliding bicycle support 1400 slidably engages with the longitudinal members 1200 in any suitable manner, such as a track or rail system.

The sliding bicycle support 1400 is adapted to receive the bicycle in a horizontal orientation such that the rear wheel or cassette of the rear wheel is supported thereby. In the illustrated embodiment the sliding bicycle support 1400 comprises a base 1405 pivotally connected to a cradle plate 1406 via post 1410 disposed in a center thereof. The longitudinal members 1200 extend through a pair of corresponding apertures through opposing sides of the base 1405, wherein the cradle plate 1406 is not directly connected to the longitudinal members 1200 and is adapted to pivot from side to side relative to the base 1406 and longitudinal members 1200. In the illustrated embodiment, the cradle plate 1406 overlays the base 1405 and share a same outer perimeter.

Figure 3:
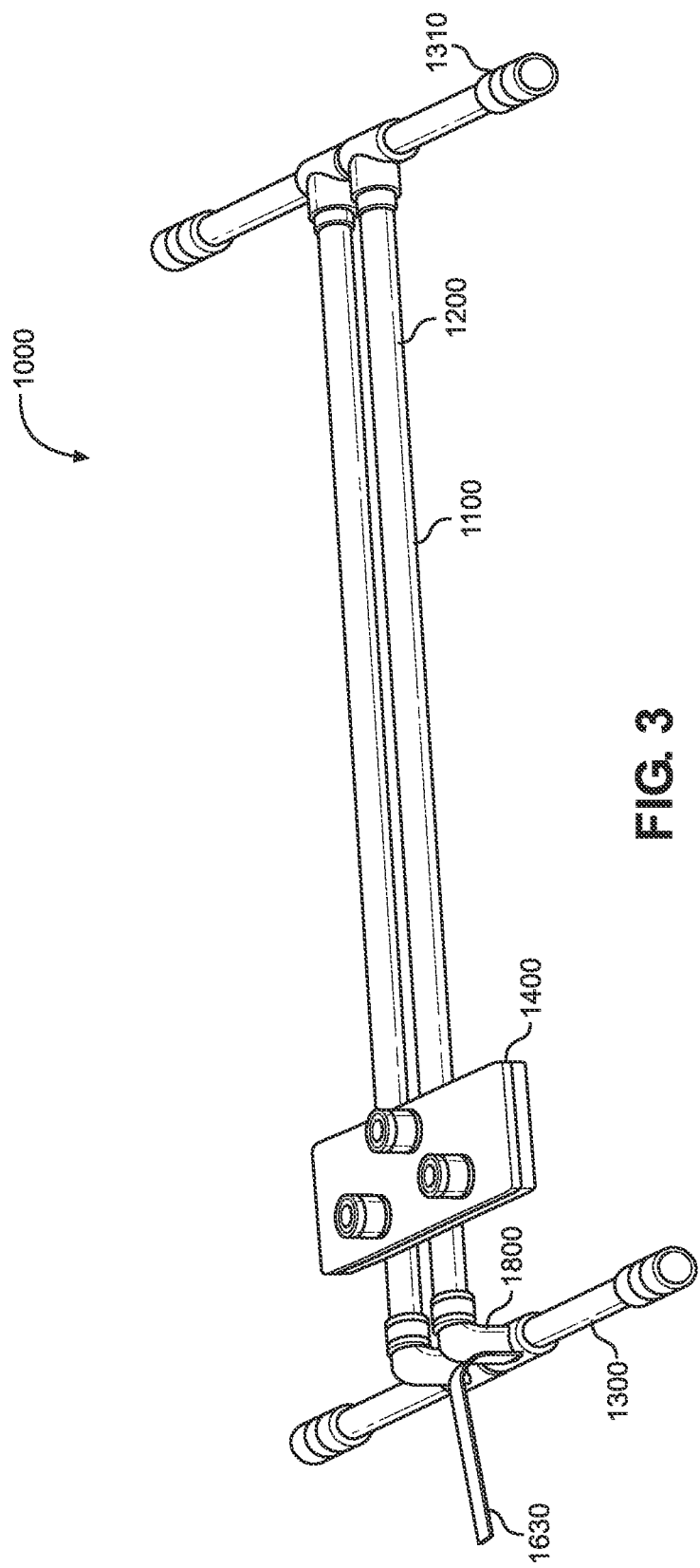
FIG. 3 shows a perspective view of an alternate embodiment of the bicycle mounting device.

A pair of brackets 1420 disposed along opposing lateral edges of the cradle plate 1406. In the illustrated embodiment, the sliding bicycle support 1400 comprises a first side 1430 that tapers outward to an opposing second side 1435. In some embodiments, such as shown in FIG. 3, the sliding bicycle support is rectangular in shape. In the illustrated embodiment, the post 1410 is circular and comprises a concentric notch adapted to further engage with the rear wheel of the bicycle. In some embodiments, the sliding bicycle support is planar and does not comprise a post and, in other embodiments, the sliding bicycle support comprises a plurality of posts thereon to provide multiple contact points with the bicycle. In some embodiments, the first side of the sliding bicycle support 1400 comprises a recess 1440 configured to abut a front tire of the bicycle when mounted in a vertical orientation. The recess 1440 is wide enough to receive the front bicycle tire therein.

In the illustrated embodiment, the second end of each of the pair of brackets 1420, closest to the second side 1435 of the sliding bicycle support 1400, is angled away from the post 1410. This allows the sliding bicycle support to engage the chainstay and seatstay portion of the bicycle frame simultaneously. The angle formed between the brackets 1420 is intended to correspond to the angle formed between the chainstay and the seatstay such that a first bracket of the pair contacts the chainstay and a second bracket of the pair contacts the seatstay. In some embodiments, the second end of the pair of brackets is pivotally affixed to the plate so the distance between the seconds ends can be adjusted to receive bicycles having different sized frames. In other embodiments, the entire bracket is moveable on the plate to adjust the distance between each bracket.

In some embodiments, the bicycle mounting device 1000 comprises a U-shaped brace 1500 secured to the rear end 1120 of the frame 1100. The brace 1500 is composed of a pair of parallel members 1520 joined by a curved cross member. The brace 1500 is configured to be positioned vertically to receive a rear tire through a second gap disposed between the parallel members when the bicycle is positioned in a vertical orientation. In the illustrated embodiment, the brace 1500 is movable between a stowed configuration and a deployed configuration. In the stowed configuration, the brace 1500 is stored beneath the longitudinal members 1200 and is parallel thereto. The brace 1500 lays on a same horizontal plane as the lateral members 1300, 1310. In the deployed configuration, the brace 1500 is disposed along a vertical axis atop at the second end of the frame.

In some embodiments, the brace 1500 is pivotally secured to the frame 1100 via a clip 1510 such that it can be rotated around the second lateral member 1310 between the stowed and deployed configurations. In alternate embodiments, the brace 1500 can be removed and attached from the frame 1100 to secure thereto in the different orientations. In the illustrated embodiments, the second gap between the parallel members 1520 comprises a same distance as the first gap or gap between the longitudinal members 1200, wherein the distance of the gaps is measured between the pair of respective members. The first gap and second gap are aligned such that the rear tire can be received in both gaps simultaneously. In the illustrated embodiment, the brace 1500 is telescopic. The parallel members 1520 are composed of telescoping tubular rods 1525 that allow for a length adjustment thereof.

In the illustrated embodiment, the front end of the frame 1120 comprises a bicycle fork mount 1600 to assist with the mounting of the bicycle in a vertical orientation. The fork mount 1600 is configured to receive a bicycle fork when the front tire is removed therefrom. The fork mount 1600 comprises a pair of rods configured to receive the aperture of the bicycle fork. Once mounted thereto fasteners such as a nut can be disposed on the ends of the rods to prevent the fork from sliding or falling off therefrom.

In the illustrated embodiment, the front end 1110 and the rear end 1120 of the frame 1100 each comprise a tire channel 1650, 1700 configured to receive the front tire and the rear tire, respectively, of the bicycle when stored in the vertical orientation. The tire channels 1650, 1700 are sized to receive each tire in close tolerance therewith. In the illustrated embodiment, the front tire channel 1650 comprises a same width as the rear tire channel 1700. The front tire channel 1650 is configured to receive the front tire of the bicycle when the bicycle is mounted to the device 1000 with the front tire still secured to the bicycle fork. In this way, the bicycle mounting device can receive and store the bicycle in multiple vertical orientations, which include the front tire attached or detached from the bicycle frame.

Figure 4:
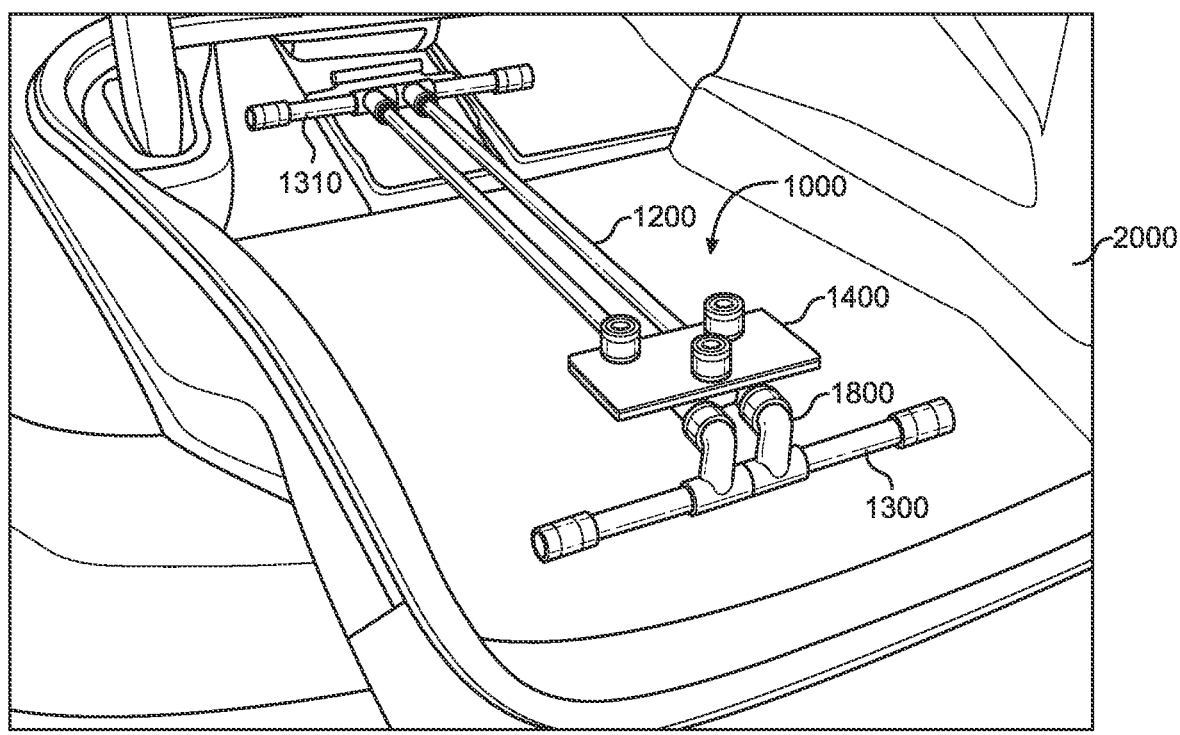
FIG. 4 shows a perspective view of an alternate embodiment of the bicycle mounting device mounted in a vehicle.

Referring now to FIGS. 3 and 4, there is shown a perspective view of an alternate embodiment of the bicycle mounting device and a perspective view of an alternate embodiment of the bicycle mounting device mounted in a vehicle, respectively. In some embodiments, the front end 1110 of the frame 1100 is raised relative to the rear end 1120 thereof via a vertical member 1800. In the illustrated embodiment, the bicycle mounting device 1000 comprises a pair of vertical members 1800 extending directly from the longitudinal members and connected to the first lateral member 1300. In some embodiments, the vertical members 1800 are telescopic such that the height of the front end of the frame 1100 is adjustable. This embodiment can be used in a trunk of a vehicle having an unlevel surface. For example, in many types of vehicles, such as sedans or vehicles with a rear seat folding feature, the surface area in a trunk space adjacent to the rear seat comprises a hump or other type of protrusion that causes elevation thereto. In some embodiments, a fastener such as a strap 1630 extends from the first end of the frame 1100 and is configured to form a loop around the bicycle frame to secure the bicycle frame to the frame.

Figure 5:
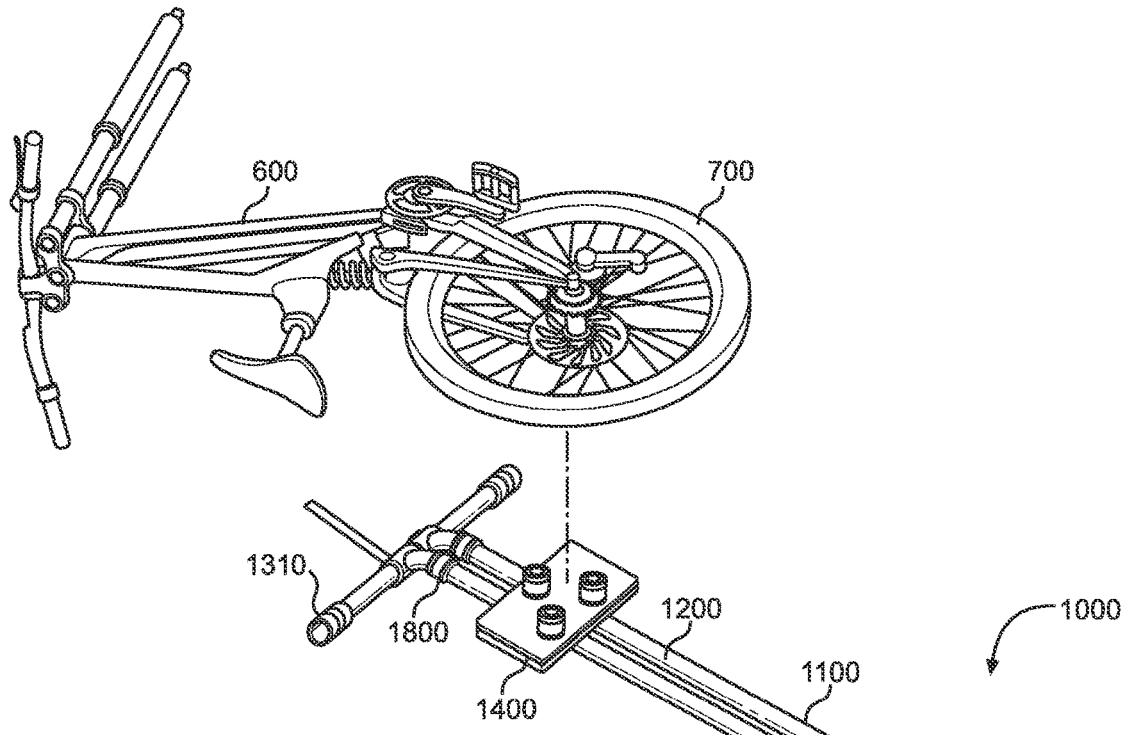
FIG. 5 shows a perspective view of an embodiment of the bicycle mounting device in a first position and a bicycle positioned above a sliding bicycle support.
Figure 6:
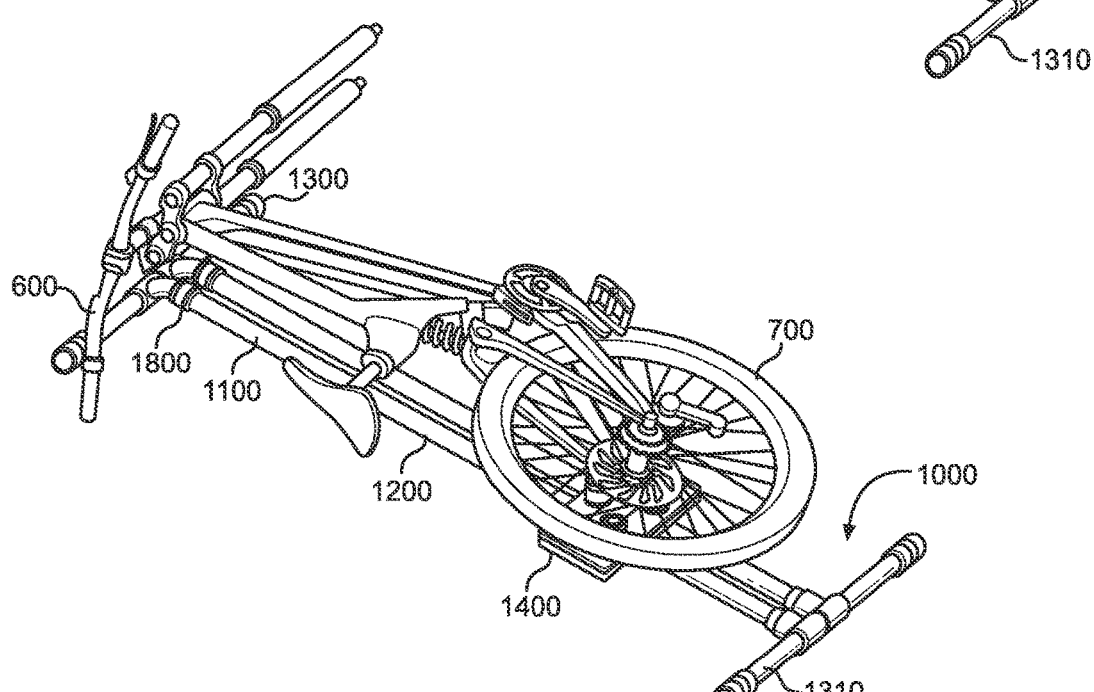
FIG. 6 shows a perspective view of an embodiment of the bicycle mounting device in a second position wherein a bicycle is mounted thereto.
Figure 7:
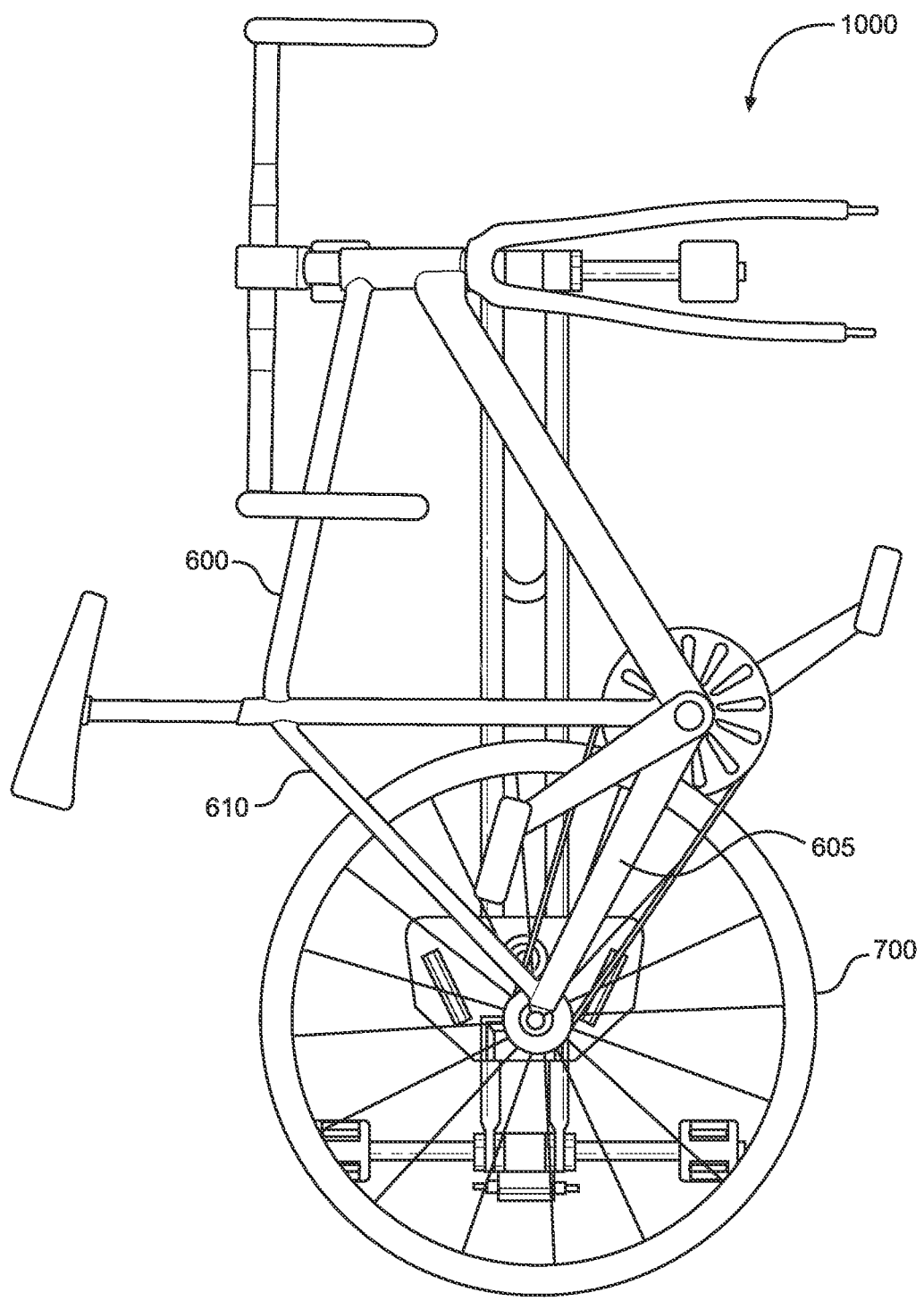
FIG. 7 shows a top planar view of an embodiment of the bicycle mounting device in a second position wherein a bicycle is mounted thereto.

Referring now to FIGS. 5-7, there is shown a perspective view of an embodiment of the bicycle mounting device in a first position, the bicycle mounting device in a second position, and a top planar view of the bicycle mounting device in a second position, respectively. In operation to store the bicycle in a horizontal orientation, the rear end of the frame is placed on the elevated portion within the vehicle such that the second lateral member 1310 is placed furthest within the vehicle. The first lateral member 1300 is disposed on the flat or lower portion of the vehicle surface area. In embodiments without the vertical member, the lateral members 1310 are placed on the same level surface. In this way the longitudinal members 1200 are level and disposed on a horizontal plane in either embodiments. A user can remove the front tire from their bicycle 600 and orient the bicycle 600 horizontally. The sliding support 1400 is in a first or starting position, which is nearest to the front end of the frame 1100. The rear tire 700 is placed on the sliding bicycle support 1400 such that the chainstay 605 and seatstay 610 are aligned with the pair of brackets or posts, depending on the embodiment. The sliding support 1400 is moved from the first position to a second position via a sliding motion, wherein the second position the sliding support 1400 is nearest to the rear end of the frame 1100. When the sliding support is positioned at the rear end, the bicycle 600 is fully in the trunk and the user can shut the trunk door.

Figure 8:
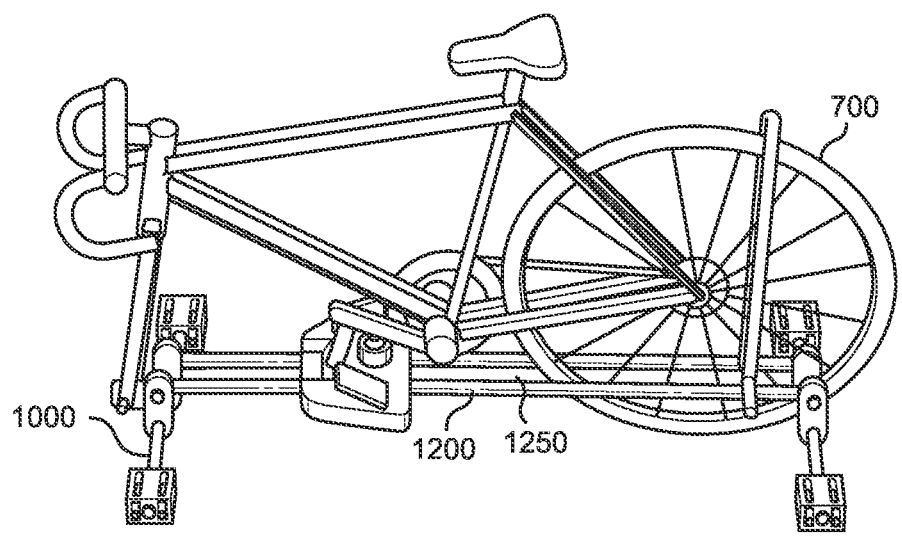
FIG. 8 shows a perspective view of an embodiment of the bicycle mounting device and a bicycle mounted thereto in a vertical orientation.
Figure 9:
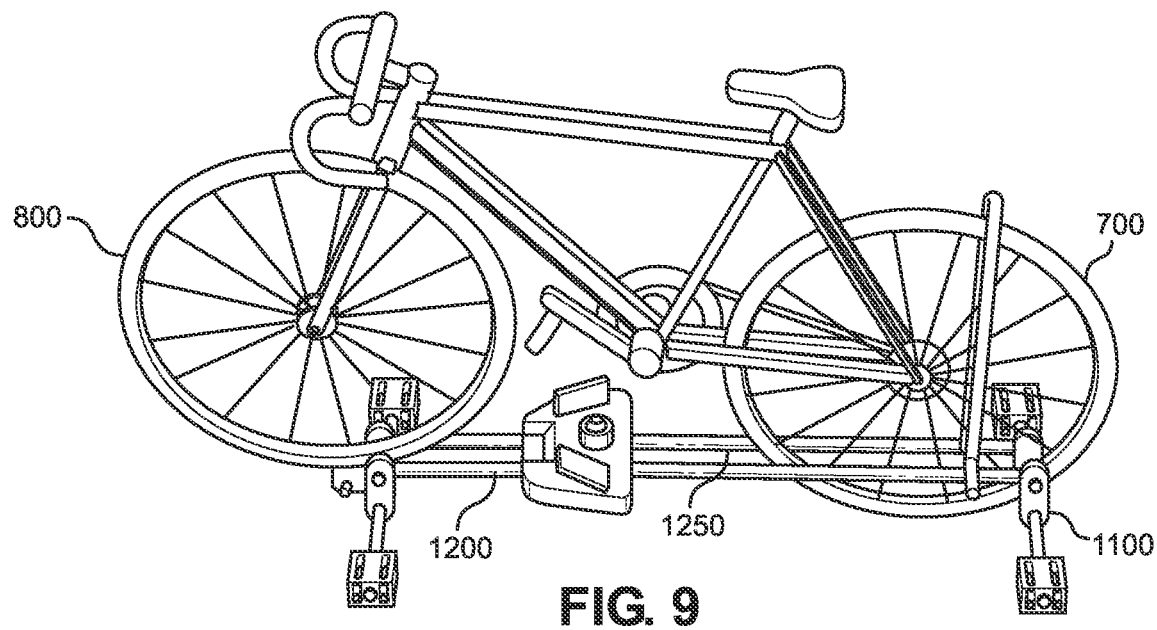
FIG. 9 shows perspective view of another embodiment of the bicycle mounting device and a bicycle mounted thereto in a vertical orientation.

Referring now to FIGS. 8 and 9, there are shown perspective views of an embodiment of the bicycle mounting device and a bicycle mounted thereto in a vertical orientation. The pair of longitudinal members form a first gap 1250 therebetween, wherein the first gap 1250 is configured to receive the rear tire 700 therethrough while the bicycle mounting device supports the bicycle 600 in a vertical orientation. In the illustrated embodiment, the first gap 1250 extends the entire length of the longitudinal members 1200. However, in alternate embodiments, it is contemplated that a recess or elongated slot is disposed at the rear end of the frame 1100 configured to receive the lower end of the rear tire, wherein the frame comprises a single longitudinal member. The rear wheel is secured within the first gap 1250 and a front of the bicycle 600 is otherwise secured to the opposing front end of the frame 1100. The bicycle 600 can be mounted in a vertical orientation with or without the front tire secured to the bicycle fork. In some embodiments, the front tire is removed, and the bicycle fork is secured to the bicycle fork mount. In other embodiments, the front tire remains on the bicycle and is positioned through the front tire channel. In this embodiment, the front end of the bicycle is elevated above the rear end because the rear tire rests within the first gap 1250 of the longitudinal members. In other embodiments, it is contemplated that both the front and rear tires rest within the gap 1250 when mounted to the bicycle mounting device 1000.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle mounting device, comprising:
   a frame forming an I-shape having a longitudinal member, a first lateral member and a second lateral member, wherein the first lateral member is affixed to a first end of the longitudinal member and the second lateral member is affixed to an opposing second end of the longitudinal member;
   a sliding bicycle support operably connected to the pair of longitudinal members, the sliding bicycle support adapted to slide between the first and second end thereof;
   wherein the sliding bicycle support is adapted to support a bicycle in a horizontal orientation thereon;
   a gap disposed on the second end of the longitudinal member;
   wherein the frame is configured to support the bicycle in a vertical orientation thereon, such that a rear wheel of the bicycle is secured within the gap and a front of the bicycle is secured to the opposing end of the frame.

2. The bicycle mounting device of claim 1, wherein the sliding bicycle support comprises a plate having a post disposed centrally thereon and a pair of brackets disposed along opposing lateral edges of the plate, wherein the brackets are positioned so as to prevent a chainstay and a seatstay of the bicycle from sliding over an edge of the plate and orienting the bicycle with the frame.

3. The bicycle mounting device of claim 2, wherein each of the pair of brackets is angled from a longitudinal axis of the longitudinal member.

4. The bicycle mounting device of claim 3, wherein the plate tapers toward the first end of the longitudinal member.

5. The bicycle mounting device of claim 3, wherein a second end of the pair of brackets is pivotally affixed to the plate so the angles thereof are adjustable.

6. The bicycle mounting device of claim 1, further comprising a stabilizing support disposed on opposing ends of each of the pair of lateral members.

7. The bicycle mounting device of claim 6, wherein each stabilizing support comprises a planar lower surface and an opposing planar upper surface.

8. The bicycle mounting device of claim 6, wherein each stabilizing support comprises a fastener on a lower planar surface thereof configured to prevent movement of the bicycle mounting device when positioned on a surface.

9. The bicycle mounting device of claim 8, wherein the fastener is hook and loop material configured to secure to a carpet material of a vehicle.

10. The bicycle mounting device of claim 1, further comprising apertures for receiving a cord to secure the bicycle mounting device to a vehicle.

11. The bicycle mounting device of claim 1, further comprising a strap extending from the first end of the frame configured to form a loop around the bicycle to secure the bicycle to the frame.

12. The bicycle mounting device of claim 1, further comprising a U-shaped brace secured to the second end of the frame, wherein the brace is configured to receive a rear tire of the bicycle.

13. The bicycle mounting device of claim 12, wherein the brace is telescopic.

14. The bicycle mounting device of claim 12, wherein the brace is pivotally secured to the second lateral member.

15. The bicycle mounting device of claim 1, wherein the first end of the frame is raised relative to the second end thereof via an upstanding leg.

16. The bicycle mounting device of claim 15, wherein the upstanding leg is adjustable in height via an adjustment mechanism.

17. The bicycle mounting device of claim 16, wherein the adjustment mechanism is a telescopic leg disposed between the longitudinal member and first lateral member.

18. The bicycle mounting device of claim 1, further comprising a fork mount disposed on the first lateral member and configured to secure a front end of a bicycle fork thereto.

19. The bicycle mounting device of claim 1, wherein the second lateral member comprises a rear tire channel adapted to receive a rear tire of the bicycle and the first lateral member comprises a front tire channel adapted to receive a front tire of the bicycle.

20. The bicycle mounting device of claim 1, wherein the longitudinal member comprises a pair of longitudinal members and the gap is formed therebetween.

* * * * *